J. DIERKS.
STOCK FEEDER.
APPLICATION FILED DEC. 29, 1919.

1,398,179.

Patented Nov. 22, 1921.

INVENTOR.
JOHN DIERKS.
BY A. B. Bowman
ATTORNEYS.

UNITED STATES PATENT OFFICE.

JOHN DIERKS, OF SULPHUR SPRINGS, TEXAS.

STOCK-FEEDER.

1,398,179.   Specification of Letters Patent.   Patented Nov. 22, 1921.

Application filed December 29, 1919. Serial No. 348,110.

*To all whom it may concern:*

Be it known that I, JOHN DIERKS, a citizen of the United States, residing at Sulphur Springs, in the county of Hopkins and State of Texas, have invented a certain new and useful Stock-Feeder, of which the following is a specification.

My invention relates to stock feeders for automatically feeding grain or mill food to stock, more particularly adapted for the feeding of hogs and the objects of my invention are: first, to provide a stock feeder of novel construction; second, to provide a stock feeder with a feeding trough on opposite sides of a storage hopper; third, to provide a stock feeder of this class in which the storage hopper is pivotally supported on a horizontal axis adapted to be oscillated slightly by the animal feeding so that the food is automatically fed into the troughs; fourth, to provide means for agitating, jarring and moving the food in the hopper so that it will not pack and will feed readily, all of which is operated by the animal in feeding, and fifth, to provide a stock feeder of this class which is very simple and economical of construction, durable, sanitary, automatic in its action and in which the food will not be wasted or destroyed by the elements and in which the food is covered when the stock are not feeding.

Figure 1:
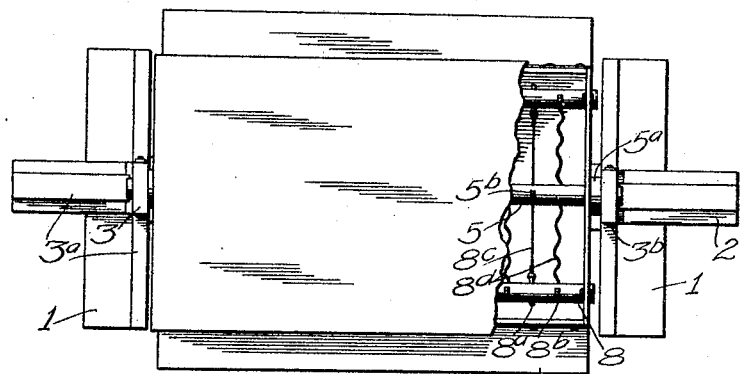
Figure 2:
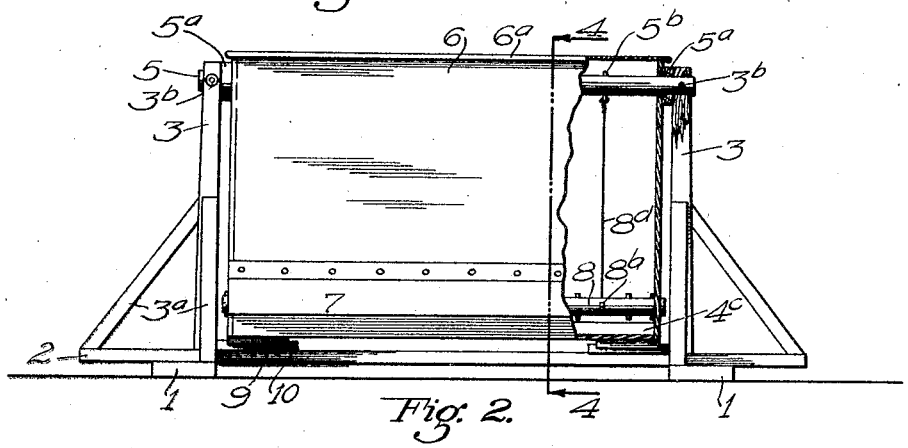
Figure 3:
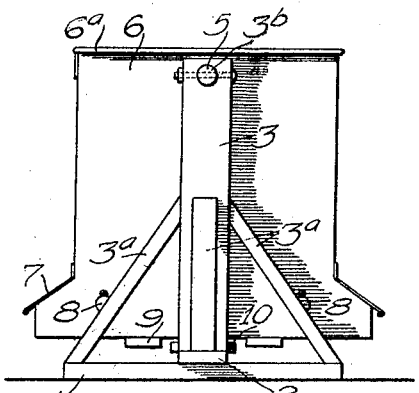
Figure 4:
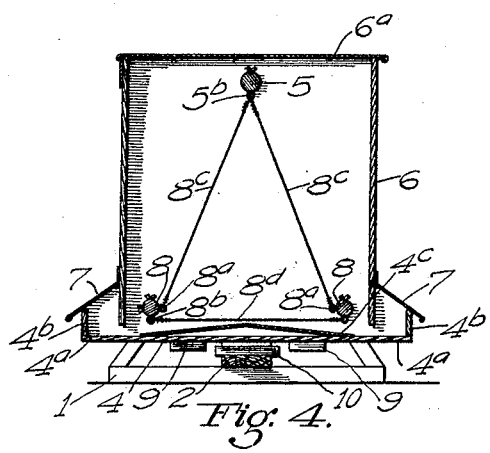

With these and other objects in view as will appear hereinafter my invention consists of certain novel features of construction, combination and arrangement of parts and portions as will be hereinafter described in detail and particularly set forth in the appended claims reference being had to the accompanying drawings and to the characters of reference thereon which form a part of this application, in which:

Figure 1 is a top or plan view of my feeder showing a portion of the top broken away to facilitate the illustration; Fig. 2 is a side elevational view thereof showing a portion broken away and in section to facilitate the illustration; Fig. 3 is an end view of the feeder and Fig. 4 a sectional view through 4—4 of Fig. 2.

Similar characters of reference refer to similar parts and portions throughout the several views of the drawings.

The sills 1, longitudinal beam 2, uprights 3, hopper bottom 4, shaft 5, hopper 6, trough covers 7, agitator shafts 8, bumper blocks 9 and abutments 10 constitute the principal parts and portions of my stock feeder.

The sills 1 are of the proper length to support the hopper in position and they are positioned one at each end of the hopper. Extending longitudinally with the hopper, on the middle of said sills is a longitudinal beam 2 which extends past said sills a short distance. Mounted on this beam 2 are the uprights 3 which are supported in upright position by means of the braces $3^a$, the lower ends of some of which are mounted on the ends of the sills 1 and the lower ends of the others are mounted on the ends of the beam 2. The upper ends of the uprights 3 are provided with holes $3^b$ in which is secured a shaft 5 which extends between the uprights 3 and forms a pivotal support for the hopper 6 which is pivotally mounted on this shaft between the uprights 3 and adapted to oscillate thereon. Mounted between the uprights and the end of the hopper are washers $5^a$ which form separators and provide clearance between the ends of the hopper and said uprights. This hopper 6 is preferably rectangularly shaped as shown, and provided with a lid $6^a$ on its top to facilitate the placing of food in said hopper. Mounted longitudinally in the lower side of the hopper are the agitating shafts 8 which are provided with extended series of cotter pins $8^a$, extending through said shafts and with another series of cotter pins $8^b$ at right angles thereto. The shaft 5 is also provided with a series of cotter pins $5^b$ and connecting the cotter pins $5^b$ and $8^a$ are agitating cables $8^c$ and connecting the two series of cotter pins $8^b$ in the two shafts 8 are a series of agitating cables $8^d$. This hopper 7 is provided with a bottom portion 4 secured thereto and its sides are extended at $4^a$ and provided with right angled sides $4^b$ forming a trough over which are mounted the covers 7 which are pivoted on the sides of the hopper 6 and extend past the portions $4^b$ of the trough 4 so that the animal in feeding may place its snout against the extending portion of the cover and raise the same. Secured in the middle of the base portion 4 is a bevel shaped plate member $4^c$ which is adapted to facilitate the movement of the feed in the hopper outwardly toward the trough. Mounted on the lower side of the member 4 are bumper members 9 which are adapted to bump against abutments 10 secured on the beam 2 adapted to jar the food in the hopper, causing it to feed readily into the trough portion 4ª and the agitating members 8ᶜ and 8ᵈ also tend to agitate the food and cause it to move toward the trough portion 4ª.

Though I have shown and described a particular construction, combination and arrangement of parts and portions I do not wish to be limited to this particular construction, combination and arrangement but desire to include in the purview of my invention the construction, combination and arrangement substantially as set forth in the appended claims.

It is obvious that with this construction there is provided a stock feeder in which the hopper is suspended upon a horizontal shaft and oscillated by the stock in feeding. That in its oscillating movement it strikes against an abutment, causing a jar to the hopper and causing it to feed readily.

Having thus described my invention what I claim as new and desire to secure by Letters Patent, is:

1. A stock feeder including, a supporting frame, an open bottom food hopper suspended on said supporting frame and adapted to oscillate thereon, a bottom, carrying food troughs, rigidly secured to said hopper, spaced below the side edges of said hopper, and means positioned on said hopper bottom adapted to engage an abutment on said supporting frame for jarring said hopper during its oscillation.

2. A stock feeder including, a supporting frame, an open bottom food hopper suspended on said supporting frame and adapted to oscillate thereon, a bottom, carrying food troughs, rigidly secured to said hopper, spaced below the side edges of said hopper, means positioned on said hopper bottom adapted to engage an abutment on said supporting frame for jarring said hopper during its oscillation and means in said hopper for further agitating the food in said hopper.

3. A stock feeder including, a supporting frame, a food hopper suspended on said supporting frame and adapted to oscillate thereon, means on said hopper adapted to engage an abutment on said supporting frame for jarring said hopper during its oscillation, and means in said hopper for further agitating the food in said hopper, comprising a plurality of shafts, one of which is stationary and the others revoluble, and a series of cables connecting said shafts.

4. A stock feeder including a supporting frame provided with a pair of spaced apart uprights, a shaft secured to said uprights, a hopper provided with troughs on opposite sides pivotally mounted on said shaft, means mounted on said frame adapted to engage means mounted on said hopper for causing a jar on said hopper when oscillating on said shaft and means pivotally mounted on said hopper connected with said shaft for further agitating the food in said hopper with the oscillation of said hopper.

In testimony whereof, I have hereunto set my hand at Sulphur Springs, Texas, December, 1919.

JOHN DIERKS.